(12) United States Patent
Zamora Esquivel et al.

(10) Patent No.: US 11,501,584 B2
(45) Date of Patent: Nov. 15, 2022

(54) IN-CABIN ACOUSTIC-BASED PASSENGER OCCUPANCY AND SITUATION STATE ASSESSMENT

(71) Applicant: Intel Corporation, Santa Clara, CA (US)

(72) Inventors: Julio Zamora Esquivel, Zapopan (MX); Ignacio J. Alvarez, Portland, OR (US); Hector Cordourier Maruri, Guadalajara (MX); Jesus Cruz Vargas, Zapopan (MX); David I. Gonzalez Aguirre, Hillsboro, OR (US); Alejandro Ibarra von borstel, Zapopan (MX); Paulo Lopez Meyer, Zapopan (MX); Jose Rodrigo Camacho Perez, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 376 days.

(21) Appl. No.: 16/830,769

(22) Filed: Mar. 26, 2020

(65) Prior Publication Data
US 2020/0226856 A1  Jul. 16, 2020

(51) Int. Cl.
*G07C 5/08* (2006.01)
*G01V 1/00* (2006.01)
*G06N 20/00* (2019.01)
*B60R 11/02* (2006.01)

(52) U.S. Cl.
CPC .......... *G07C 5/0808* (2013.01); *G01V 1/001* (2013.01); *G06N 20/00* (2019.01); *B60R 11/0217* (2013.01); *B60R 11/0247* (2013.01)

(58) Field of Classification Search
CPC ...... G07C 5/0808; G01V 1/001; G06N 20/00; G06N 3/0454; G06N 3/08; G01N 29/14; G01N 29/043; B60R 11/0217; B60R 11/0247; B60R 16/023; B60R 16/037; G10L 25/51; G10L 15/16; G01H 1/06; G01H 11/00; H04R 1/20; H04R 3/00
See application file for complete search history.

(56) References Cited

U.S. PATENT DOCUMENTS

| | | | |
|---|---|---|---|
| 2001/0038698 A1* | 11/2001 | Breed | B60N 2/002 381/86 |
| 2015/0120136 A1 | 4/2015 | Jung et al. | |
| 2019/0257794 A1* | 8/2019 | McGovern | G01N 29/043 |

OTHER PUBLICATIONS

Kalmar "Smart Speaker: Suspicious Event Detection with Reverse Mode Speakers", Jul. 1-3, 2019 https://ieeexplore.ieee.org/document/8769024 (Year: 2019).*

(Continued)

*Primary Examiner* — Yogeshkumar Patel
(74) *Attorney, Agent, or Firm* — Banner & Witcoff Ltd.

(57) ABSTRACT

Techniques are disclosed to use existing vehicle speakers alone or in conjunction with other sensors (e.g. SRS sensors and/or microphones) that may already be implemented as part of the vehicle to identify acoustic signatures. Suitable low-cost and widely available hardware components (e.g., relays) may be used to modify the vehicle's existing speakers for a bi-directional mode of operation. Moreover, the vehicle's existing of audio amplifiers may be used to amplify signals collected by the speakers when operating in "reverse," and process these collected signals to determine vehicle state information.

23 Claims, 6 Drawing Sheets

(56) References Cited

OTHER PUBLICATIONS

Kalmar, Gyorgy: "Smart Speaker: Suspicious Event Detection with Reverse Mode Speakers", 2019 42nd International Conference on Telecommunications and Signal Processing (TSP), IEEE, Jul. 1, 2019, pp. 509-512, XP033579787, DOI: 10.1109/TSP.2019.8769024.
European Partial Search Report dated Jun. 9, 2021 for European Patent Application No. 20213264.3.

* cited by examiner

IN-CABIN ACOUSTIC-BASED PASSENGER OCCUPANCY AND SITUATION STATE ASSESSMENT

TECHNICAL FIELD

Aspects described herein generally relate to techniques using identified acoustic signatures for the determination of vehicle state information.

BACKGROUND

Data indicative of vehicle occupancy and, more specifically, which seats within a vehicle are occupied by a person may be valuable for vehicle operation. For instance, a supplemental restraint system (SRS), otherwise known as airbags, may use this information to selectively enable SRS functionality only for those seats that are currently occupied by a person for safety reasons. This data is conventionally obtained via the implementation of dedicated SRS occupancy sensors that measure the presence of an occupant in each vehicle's seat. However, such sensors increase manufacturing costs as several (e.g. 5 to 9) are typically required for each vehicle.

Additional vehicle state information such as whether sunroofs and windows are open or closed, for example, may also be useful to provide convenient features such as automatic closure in the event of rain. Moreover, vehicle state information such as diagnostic data collected while a vehicle is in use may help in the early identification of problematic issues. However, often vehicles do not have sensors for such purposes or, in the event that such sensors are present, these add to the cost and complexity of the vehicle design.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
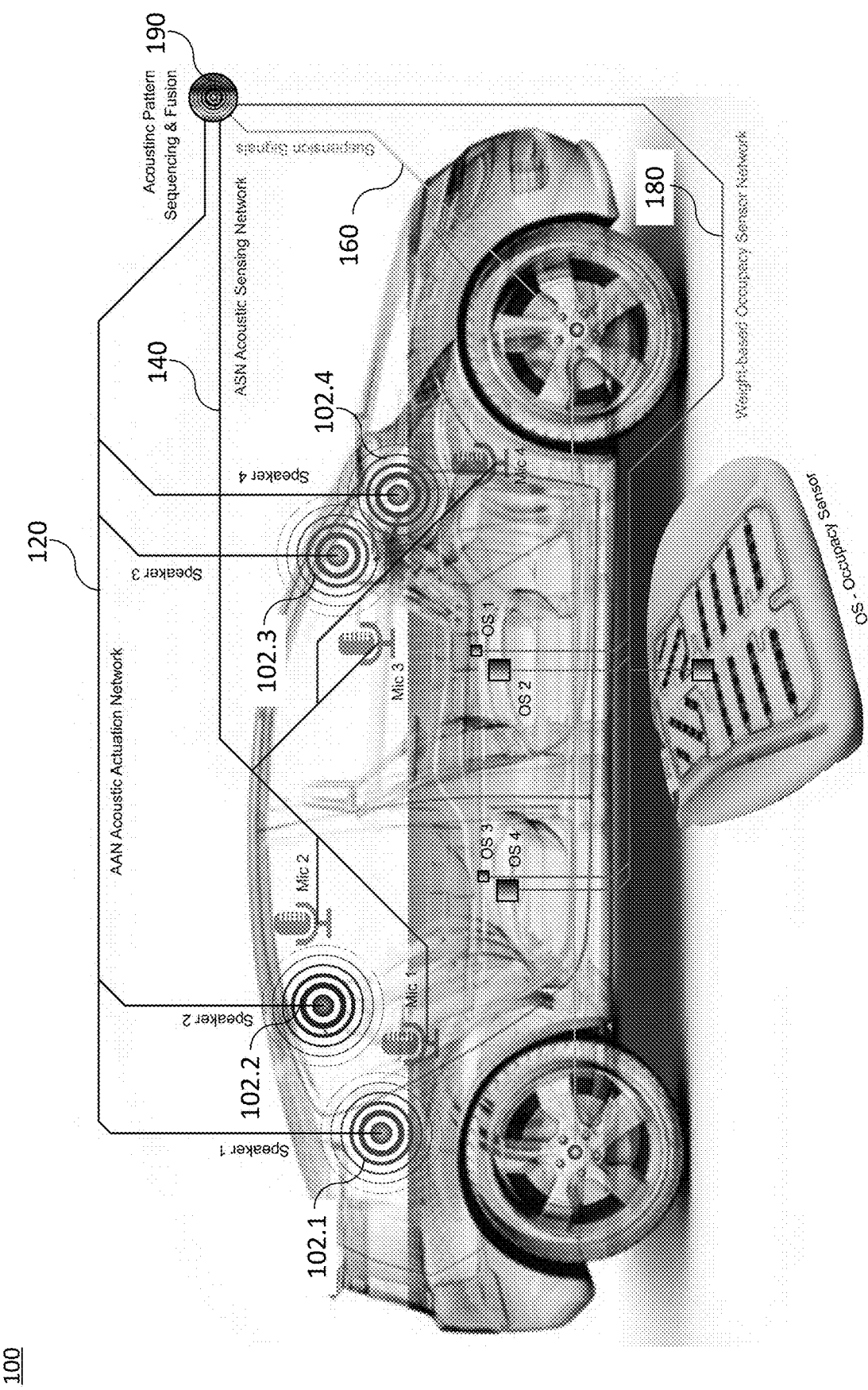
FIG. 1 illustrates an exemplary vehicle in accordance with various aspects of the present disclosure.

The following detailed description refers to the accompanying drawings that show, by way of illustration, exemplary details in which the aspects of the disclosure may be practiced. In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As noted above, current vehicle sensor systems introduce cost and complexity into vehicle designs. For instance, SRS sensors are costly and require power and data wiring to vehicle systems for their operation. The accuracy to detect a person or an object on a seat also depends on the sensor location. Moreover, vibration sensors are capable of capturing vibrations occurring in a vehicle to determine vehicle diagnostic information, but such sensors are not mounted in the vehicle, as these require the use of lasers to measure vibrations produced by the car while working in an idle position. Such vibration sensors are also very expensive, and are only used at the time of vehicle manufacture or in a vehicle service center, and thus do not represent a practical solution to providing diagnostic data during vehicle operation.

Again, the addition of sensors in a vehicle increases the level of security and comfort for the user, but also increases the cost of fabrication, particularly when the sensors required are to be deployed in various locations within the vehicle cabin. To avoid this increase in instrumentation and fabrication costs, the aspects described herein reuse the speakers from the audio system already available in the vehicle to detect acoustic signatures. Using these acoustic signatures, the aspects described herein function to sense the presence or absence of people/objects on the vehicle's seats, to determine the state of the vehicle (e.g., whether the windows and/or sunroof are open or closed), and to infer vehicle status information that may be useful to perform a diagnosis of the vehicle. For example, the acoustic signatures may identify vehicle vibration patterns and thus provide diagnostic vehicle data regarding the operation of the brakes, an unbalanced suspension, the engine, etc.

As further discussed below, the aspects described herein may use the existing speakers alone or in conjunction with other sensors (e.g. SRS sensors and/or existing in-vehicle microphones) that may already be implemented as part of the vehicle to identify acoustic signatures and/or occupancy information. Aspects include using suitable low-cost and widely available hardware components (e.g., relays) to enable operation of the vehicle's existing speakers in a bi-directional mode of operation. Moreover, the aspects described herein leverage the use of audio amplifiers already implemented within the vehicle to amplify signals collected by the speakers when operating in "reverse," and to process these collected signals to determine the vehicle's current state (occupancy, windows and doors open or closed, etc.).

The aspects described herein thus enable the addition of features to a vehicle without the need for additional instrumentation by reusing the hardware already implemented in the vehicle. The aspects also advantageously provide the ability to detect early vehicle failures, as the vibration patterns captured by the speakers may be monitored for changes over time due to the vehicle's usage. Further, vibration patterns associated with sudden changes can likewise indicate a malfunction, such as low air intake in the pistons, for instance.

Still further, the aspects as described herein facilitate the detection of a type of terrain, which may be particularly useful for mapping methodologies and/or to identify the conditions on the road to adjust the vehicle's settings to better protect it. As mentioned above, the aspects described herein may also advantageously be used to identify the state of the vehicle, such as whether vehicle windows or sunroofs are open or closed. Doing so may enable the vehicle to execute certain actions based upon the state of the vehicle. For example, a control system of the vehicle may communicate with appropriate vehicle interfaces to automatically close windows and/or sunroofs if left open and rain is detected. Additionally or alternatively, a control system of the vehicle may communicate with various vehicle interfaces to cause a notification to be transmitted to a user (e.g. a text message, phone call, etc.) in such a scenario.

FIG. 1 illustrates an exemplary vehicle in accordance with various aspects of the present disclosure. The vehicle 100 as shown in FIG. 1 includes an acoustic actuation network (AAN) 120, an acoustic sensing network (ASN) 140, a suspension signal network 160, and an occupancy-based sensor network 180. The various networks shown in FIG. 1 may form part of the vehicle 100 at the time of manufacture or may be added to the vehicle 100 as one or more aftermarket components. In an aspect, the AAN 120 may include any suitable number N of speakers 102.1-102.N, with four being shown in FIG. 1 for purposes of brevity. The AAN 120 is the primary focus of the aspects as described herein, and is further discussed below. The AAN 120 may include any suitable type of speakers 102.1-102.N, as well as any other suitable audio components to facilitate playing audio such as music, vehicle alerts and/or chimes, etc. The AAN 120 may thus include, in addition to the speakers 102.1-102.N, suitable audio components such as amplifiers, drivers, connectors, speaker and/or data wiring coupling the speakers 102.1-102.N to the vehicle 100's audio system (e.g. an entertainment system or infotainment system), etc., which are not shown in FIG. 1 for purposes of brevity.

The AAN 120 may function as a conventional vehicle speaker system to play sounds via each of the speakers 102.1-102.N. Additionally, aspects include the AAN 120 including other suitable switching components, as further discussed below but not shown in FIG. 1 for purposes of brevity, that configure one or more of the speakers 102.1-102.N to function as a microphone. In such a configuration, the speakers 102.1-102.N may provide acoustic data signals that result from vibrations of each speaker 102's diaphragm or membrane. In other words, one or more of the speakers 102.1-102.N may function bi-directionally, to either generate sound using driven audio signals provided by the vehicle 100's audio system, or to capture sounds or external vibrations that transform speaker vibrations caused by such stimuli to acoustic data signals, which are then provided to the AAN 120.

The vehicle 100 may include additional sensors as noted above. For instance, the ASN 140 may also include any suitable number of microphones and accompanying wiring and interconnections. The suspension signal network 160 may include any suitable number of sensors that may form part of the vehicle 100's suspension sensor network that generate sensor data indicative of the position and/or acceleration of the various suspension components and thus indicate a state of one or more suspension components such as shocks, struts, etc. The occupancy-based sensor network 180 may include one or more occupancy sensors that may be used as part of the SRS, for instance, along with accompanying interconnections and couplings.

Each of the AAN 120, the ASN 140, the suspension signal network 160, and the occupancy-based sensor network 180 may be coupled to one or more components of the vehicle 100 in accordance with their respective operation. For instance, data signals associated with each of the AAN 120, the ASN 140, the suspension signal network 160, and the occupancy-based sensor network 180 may be transmitted to and/or received from one or more suitable components of the vehicle 100 via one or more suitable networks and/or interfaces, such as a Controller Area Network (CAN) bus, for instance. As shown in FIG. 1, the vehicle 100 may also include a local processing unit 190, which is configured to perform acoustic pattern sequencing and fusion using the data received from one or more of the AAN 120, the ASN 140, the suspension signal network 160, and the occupancy-based sensor network 180. As discussed further herein, the acoustic pattern sequencing may be performed using one or more of the speakers 102.1-102.N when configured as a microphone, whereas the fusion is with respect to the use of data signals provided via the other vehicle components (e.g., the ASN 140, the suspension signal network 160, and the occupancy-based sensor network 180) to determine vehicle state information when such information is available.

In an aspect, the local processing unit 190 may be implemented as one or more processors, which may be dedicated for this purpose or be part of one or more other components of the vehicle 100. In an aspect, the local processing unit 190 may perform one or more functions associated with the aspects as described herein. The local processing unit 190 may be implemented, for instance, as an aftermarket installation or an electronic control unit (ECU) associated with the vehicle 100. To provide another example, the local processing unit 190 may be implemented as an ECU that was manufactured with the vehicle 100, and the aspects as described herein functionally realized via application of a software and/or component update(s) thereof.

Regardless of the implementation of the local processing unit 190, aspects include the local processing unit 190 using any portion of data provided via one or more of the AAN 120, the ASN 140, the suspension signal network 160, and the occupancy-based sensor network 180 to perform the aspects as described herein. For instance, aspects include the local processing unit 190 utilizing the acoustic data signals generated by the speakers 102.1-102.N (also referred to herein as speakers 102) when configured as microphones to determine a state of the vehicle 100, which may include the various determinations as further discussed herein such as an occupancy state, the determination of diagnostic or road data, the state of windows, doors, and sunroofs being open or closed, etc.

The data acquired in this way may be used alone or in conjunction with other data collected via the ASN 140, the suspension signal network 160, and the occupancy-based sensor network 180 to determine the state of the vehicle 100. For instance, the acoustic data signals collected via the speakers 102 may allow the state of the vehicle to be ascertained to provide redundancy in the event that other vehicle systems fail, when such components are not available, or when certain types of vehicle state information (e.g., which windows are open or closed) cannot otherwise be determined using existing vehicle sensors.

As another example, the vehicle state information determined via the acoustic data signals generated by the speakers 102 may provide another point of reference to provide robustness when similar vehicle state information is determined from other sensor systems of the vehicle 100, as state information may be verified using an additional data source. Aspects also include the determination of the state of the vehicle 100 using the acoustic data signals collected from the speakers 102 to allow certain states of the vehicle 100 to be ascertained more accurately than the vehicle 100's existing sensor systems. For instance, the occupancy sensors OS1-OS4 are typically weight-based sensors, and thus may not detect the occupancy of small children, animals, or other lightweight objects on the seats of the vehicle.

In other words, the aspects as described herein advantageously leverage the use of existing vehicle infrastructure to provide vehicle state information that may not otherwise be available, to provide data redundancy, and/or to improve upon the accuracy and robustness of other sensed vehicle state information. Again, to do so, some modifications may be required to the vehicle 100's infrastructure and, in particular to the AAN 120. Examples of such modifications are further discussed below with reference to FIGS. 2A-2B.

Figure 2A:
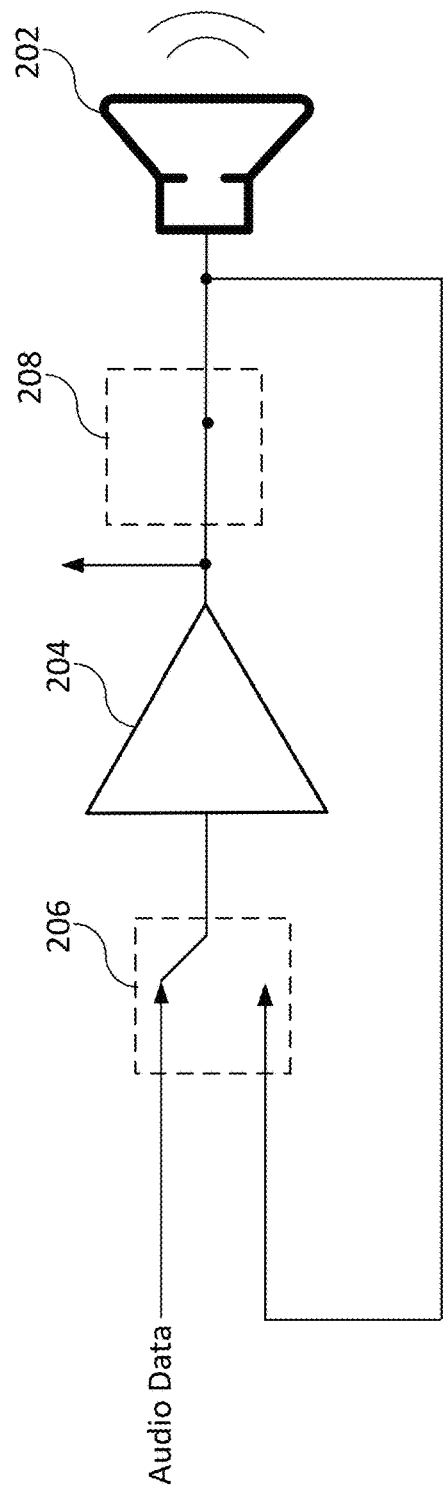
FIGS. 2A-2B illustrate an exemplary modification to a vehicle's acoustic actuation network (AAN), in accordance with various aspects of the present disclosure.
Figure 2B:
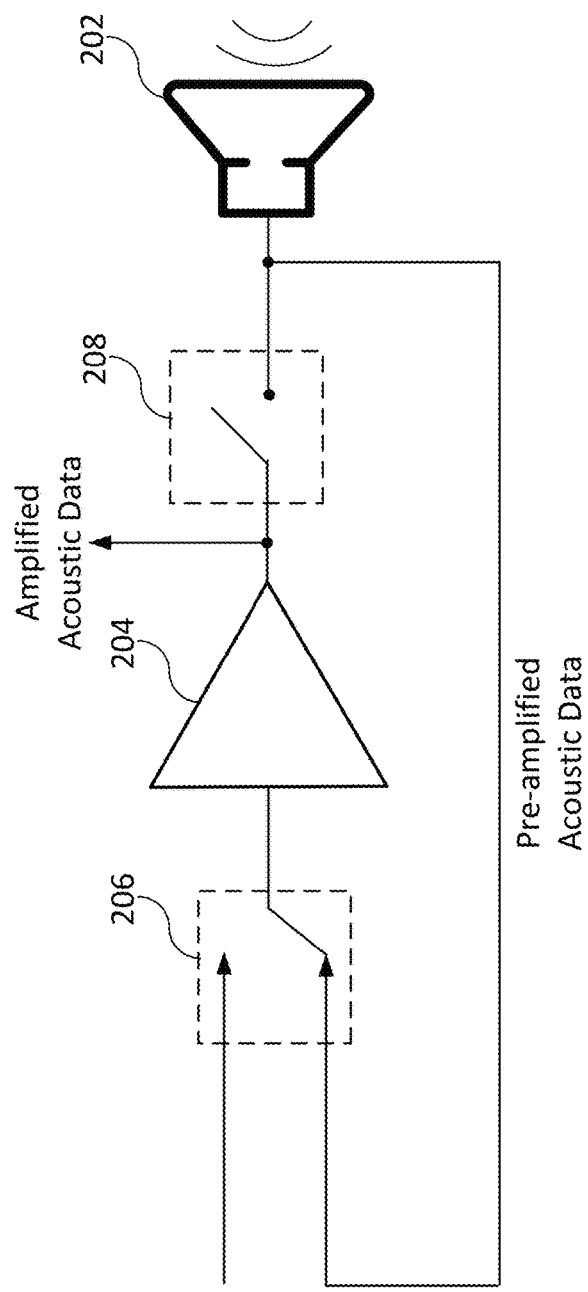

FIGS. 2A-2B illustrate an exemplary modification to a vehicle's acoustic actuation network (AAN), in accordance with various aspects of the present disclosure. As shown in FIGS. 2A-2B, the modified speaker architecture 200 includes a speaker 202 and an audio amplifier 204. Each of the speaker 202 and the audio amplifier may be part of a vehicle in which the aspects as described herein are implemented, such as the vehicle 100 as shown in FIG. 1 for instance. As an example, each of the speaker 202 and the audio amplifier may be identified with part of the AAN 120 as shown and described herein with respect to FIG. 1. Continuing this example, the speaker 202 may be identified with one of the speakers 102.1-102.N. Although the audio amplifier 204 is not shown in FIG. 1 for purposes of brevity, aspects include each one of the vehicle's speakers 102.1-102.N being coupled to and driven by a respective audio amplifier. Each speaker 102.1-102.N may be driven by a respective audio amplifier, which may be configured identical to one another or implemented as different types of amplifiers and/or in accordance with different amplifier configurations depending upon the particular speaker that is being driven.

Additional components associated with the audio amplifier 204 are not shown in FIGS. 2A-2B for purposes of brevity. For instance, aspects include the audio amplifier 204 being coupled to one or more power rails, passive components, and/or adjustable components (e.g. electronically-controlled potentiometers, tunable capacitors, etc.) to ensure that the audio data is appropriately amplified to drive the coupled speaker 202. The audio data may be, for example, an analog audio signal that is generated by a coupled audio component of the vehicle in which the modified speaker architecture 200 is implemented. The generation of the audio data signal may additionally be controlled by a local control system of the vehicle in which the modified speaker architecture 200 is implemented (e.g., the local processing unit 190), which may function to control the operating mode of the speaker 202 as well as other speakers that are implemented within the vehicle.

Moreover, although the audio amplifier 204 and the speaker 202 are shown in FIGS. 2A-2B as being coupled together via a single line or wire, this is ease of explanation, and aspects include the audio amplifier 204 being implemented in accordance with any suitable speaker driving architecture based upon the particular type of speaker 202, the wiring configuration of the vehicle, etc. For instance, although not shown in FIGS. 2A-2B for purposes of brevity, the speaker 202 and/or the audio amplifier 204 may include a second grounded input terminal. As another example, the audio amplifier 204 may include another input terminal that is coupled to the output in a feedback configuration.

Regardless of the manner in which the speaker 202 and the audio amplifier 204 are coupled to one another to form a suitable audio driving arrangement, aspects include the modified speaker architecture 200 further implementing switching components 206, 208 to control the mode of operation of the speaker 202. Although the switching components 206, 208 are shown in FIGS. 2A-2B as separate components, aspect include the switching components 206, 208 being implemented as any suitable number of components, and may be combined into a single device or package. In any event, each of the switching components 206, 208 may represent any suitable number and/or type of switches configured to make or break connections between the input of the audio amplifier 204 and the output of the audio amplifier 204.

For instance, the switching components 206, 208 may be implemented as one or more electronically-controllable switching components such as relays, transistors, etc., and which may have any suitable number of poles and/or throws depending upon the architecture and coupling between the speaker 202 and the audio amplifier 204. In an aspect, the state of the switching components 206, 208 may be controlled via electronic control signals generated by a local control system of the vehicle in which the modified speaker architecture 200 is implemented (e.g., the local processing unit 190), which is not shown in FIGS. 2A-2B for purposes of brevity. This local control system may thus function to control the operating mode of the speaker 202 by controlling the switching state of the switching components 206, 208 as well as other speakers that are implemented within the vehicle in this manner.

For instance, FIG. 2A illustrates an example of the positions of the switching components 206, 208 when the speaker 202 is operated in a "standard" speaker mode of operation. As shown in FIG. 2A, the switching component 206 couples the audio data to the input of the audio amplifier 204, and the switching component couples the output of the audio amplifier 204 to the input of the speaker 202. FIG. 2B, however, illustrates an example of the positions of the switching components 206, 208 when the speaker 202 is operated in a "reverse" mode, i.e., when configured to function as a microphone. As shown in FIG. 2B, the switching component 206 couples the input of the speaker 202, which actually functions as a speaker "output" in this configuration, to provide pre-amplified acoustic data signals to the input of the acoustic amplifier 204 via the switching component 206. The audio amplifier 204 amplifies the pre-amplified acoustic data to provide the amplified acoustic data (or simply "acoustic data"), which is coupled to the local control system (e.g., the local processing unit 190) of the vehicle. In other words, the audio amplifier 204 is re-used via the modified speaker architecture 200 to facilitate the speaker 202 functioning as a microphone as well as a speaker, thus obviating the need to install dedicated microphones for this purpose.

Again, the aspects described herein allow for dynamic configuration of vehicle speakers 102 as either speakers or microphones. When operating as a microphone, such as the speaker 202 as shown and described herein, the vehicle speakers 102 act as transducers that provide, as the pre-amplified acoustic data, electrical signals in response to movement or, more specifically, vibrations of the speaker diaphragm or membrane. These vibrations may be caused by either vibrations of the vehicle or by external sounds. Thus, in accordance with various aspects, the acoustic data signals may be analyzed to identify different types of vehicle state information based upon the specific type of stimuli that caused the speaker diaphragm vibrations, as further discussed below.

Passive Speaker Microphone Usage

In an aspect, the vehicle speakers 102 may be configured to function as microphones in a "passive" manner or an "active" manner, as further discussed below. In accordance with passive microphone aspects, a vehicle speaker 102 is configured as a microphone to generate acoustic data signals that are used to calculate acoustic signature data, which may then be used to identify external noises and vibrations of the vehicle that result from its ordinary operation. Such aspects may be particularly useful to determine road conditions or to determine vehicle diagnostic data, for instance.

For example, aspects include performing a calibration or training procedure on per-vehicle basis upon manufacture of the vehicle 100, or upon installation of the various components associated with the aspects as discussed herein, if the installation occurs as an aftermarket modification. Continuing this example, acoustic data may be collected from one or more of the speakers 102 in accordance with different driving scenarios, road conditions, or any other suitable type of vehicle or environmental information, which may be used to generate acoustic signature data for each speaker when configured to operate as a microphone under these difference scenarios. Thus, a particular vehicle state may later be identified by comparing subsequently-obtained acoustic signature data to the calibration or training data. To provide additional examples, the calibration or training data may include acoustic signatures collected while operating the vehicle under different scenarios such as idling, driving on certain types of roads (e.g., smooth, rough, dirt roads, etc.), accelerating from a stop, cruising at different velocities, etc. As further discussed below, the acoustic signature data may represent a frequency response associated with each vehicle speaker 102 that indicates variations in the acoustic amplitude as measured by each respective speaker 102 over an acoustic frequency spectrum.

This calibration or training data may be stored in or otherwise accessible by the local control system (e.g., the local processing unit 190) of the vehicle, which controls the functions of the vehicle speakers 102 and collects acoustic data from the speakers 102, as further discussed herein. Continuing this example, the passive microphone aspects may include storing the calibration or training data in any suitable format based upon the particular acoustic signal data analysis that is to be performed to identify a particular vehicle state. For example, the calibration or training data may represent predetermined or prerecorded training data that is used in accordance with any suitable type of machine learning algorithm, such as a neural network or convolutional neural network (CNN), for instance. To provide an illustrative example, the calibration or training data may represent an acoustic signature associated with each vehicle speaker 102.1-102.N for various driving scenarios and road types, as noted above. The acoustic signature data of each respective vehicle speaker 102 may thus function as an input or channel to a machine learning algorithm (e.g., input layer channels of a CNN) to train the machine learning algorithm in this manner.

The passive microphone aspects may be particularly useful for identifying changes in expected acoustic signature data associated with one or more of the speakers 102 under conditions that match those conditions for which the calibration or training data was generated, so that specific conditions may be classified accordingly. For example, the passive microphone aspects may be used to obtain acoustic signature data from one or more of the speakers 102 due to vibrations caused by driving the vehicle on certain types of roads, vibrations resulting from an engine of the vehicle, etc. The changes in the acoustic signature data for one or more of the speakers 102 may then be classified in accordance with any suitable machine learning algorithm to identify the state of the vehicle as a result of specific acoustic signatures, such as a road conditions (e.g., an indication of a smoothness of the road), vehicle diagnostic data, etc.

Active Speaker Microphone Usage

In accordance with active microphone aspects, a subset (e.g., one or more) of the vehicle speakers 102 are configured to function as speakers, while another subset (e.g., one or more) of the vehicle speakers 102 are configured to function as microphones. The subset of the vehicle speakers 102 configured to function as microphones may generate, in response to the sound generated by the subset of vehicle speakers 102 emitting predetermined sound data, acoustic data signals, which are used to calculate acoustic signatures. These acoustic signatures may then be analyzed to identify deviations from a calibrated or predetermined frequency response, i.e., what is "expected" to be heard by a vehicle speaker 102 in the vehicle cabin versus what is actually heard. Using this acoustic signature data, vehicle cabin state information (e.g. an occupancy state that is indicative of which vehicle seats are occupied by a person or object, open or closed state of one or more vehicle doors, an open or closed state of one or more vehicle windows or sunroofs, etc.) may then be inferred.

Again, in accordance with the active microphone aspects, one or more of the vehicle speakers 102 are driven so as to emit a particular sound, which is received by one or more other vehicle speakers 102 which, in response, generate acoustic data signals that are used to calculate acoustic signatures. The aspects as described herein are not limited to this predetermined sound being audible (by a human), and the sound may be generated at any suitable frequency or range of frequencies depending upon the design and capabilities of the vehicle speakers 102 that are implemented. For example, the predetermined sound may include ultrasonic frequencies that are generated in addition to or instead of audible frequencies.

Moreover, in some aspects, the predetermined sound may be the only sound that is emitted in the vehicle cabin while the other vehicle speakers 102 are configured as microphones to provide acoustic signature data, resulting in other audio being temporarily paused, suppressed, or overridden to prioritize playing the predetermined sound. However, this is also by way of example and not limitation, and other aspects include the local control system (e.g. the local processing unit 190) filtering the acoustic data to remove frequencies other than those associated with the predetermined sound. In this way, the vehicle speakers 102 may emit both the predetermined sound (which may be imperceptible to users) and other sounds (e.g., music) to generate the acoustic data signals that are used to calculate acoustic signatures.

The inference of vehicle state information in accordance with the active microphone aspects may be determined in various ways, in accordance with different aspects of the present disclosure. For example, the aforementioned use of calibration or training data in accordance with a suitable machine learning algorithm as discussed above for the passive microphone aspects may likewise be implemented for the active microphone aspects. Active microphone aspects that use machine learning algorithms in this manner may be particularly useful for identifying the state vehicle with respect to doors, windows, and sunroofs being open. This is because the acoustic signatures for these various combinations may benefit from the use of a classification system to accurately identify such vehicle states from training data that represents various combinations of different vehicle seats being occupied by a person or object, different vehicle doors being opened or closed, different vehicle windows or sunroofs being opened or closed, etc. In other words, active microphone aspects include the local control system (e.g., the local processing unit 190) of the vehicle receiving acoustic data from one or more (or all) of the speakers 102, and then using the received acoustic data to calculate a respective acoustic signature for each speaker 102 from which acoustic data was obtained. The acoustic signatures of each speaker 102 received in this way may then be used by the local control system to execute a machine learning algorithm to determine the state of the vehicle by classifying each respective acoustic signature in accordance with the training data.

As another example, the active microphone aspects include the selective analysis of acoustic signature data from specific speakers 102 in response to predetermined sounds being emitted from other speakers 102. For instance, active microphone aspects include the local control system of the vehicle (e.g., the local processing unit 190) exploiting a priori knowledge of the geometric arrangement of the speakers 102.1-102.N with respect to one another. Such aspects may be particularly useful, for example, to detect objects located on specific seats within the vehicle cabin.

Figure 3:
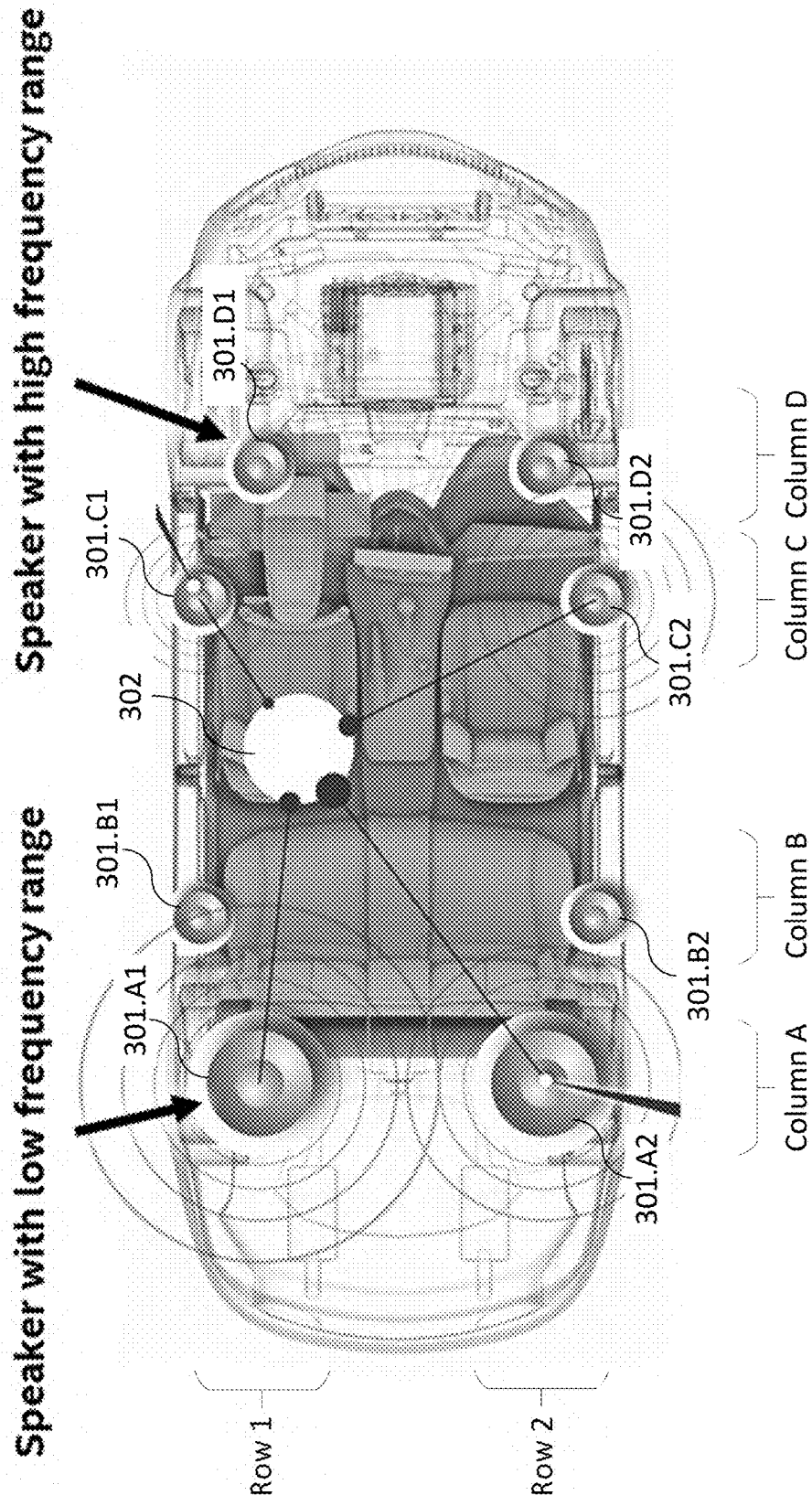
FIG. 3 illustrates an exemplary vehicle including an object in the cabin, in accordance with various aspects of the present disclosure.

To provide an illustrative example with respect to FIG. 3, a vehicle 300 is shown having a total of 8 speakers 301. The vehicle 300 may be identified with the vehicle 100 as shown and discussed herein with respect to FIG. 1, and the speakers 301 may also be identified with the vehicle speakers 102.1-102.N. Additional components and connections such as those between the speakers 301 and the local control system of the vehicle (e.g., the local processing unit 190) are not shown in FIG. 3 for purposes of brevity. For ease of explanation, the speakers 301 are shown in FIG. 3 as being arranged in a series of columns and rows, although the aspects as described herein are not limited to a specific number of speakers or such a geometric configuration. In any event, the local control system of the vehicle 300 may control each speaker 301 to independently and dynamically configure each speaker 301 as a speaker or a microphone at various times. The local control system of the vehicle 300 has access to data or is otherwise configured to operate using the geometric configuration among the speakers 301 to identify the object 302 as shown in FIG. 3.

Continuing this example, the object 302 is positioned within the cabin of the vehicle 300 as shown in FIG. 3, which may be a person or another object. The geometric relationship between the speakers 301 causes the sounds emitted from some of the speakers 301 to change the expected acoustic signature of some of the speakers 301 (which is a result of those speakers acting as a microphone to detect the emitted sounds) more than others. The sound emitted by one or more of the speakers 301 may have any suitable acoustic frequency depending upon how the machine learning algorithm implemented by the local control system is trained. For instance, the sound may be a predetermined sound having a specific frequency, range of frequencies, and/or volume level. The predetermined sound may be changed based upon the particular speaker 301 that is driven by the local control system. As an additional example, the predetermined sound may be re-used from those already generated by one or more of the speakers 301 as part of the typical operation of the vehicle 300 (e.g., an alarm chime, sounds made upon startup, etc.) and, in such a case, the collection of acoustic data may occur when the vehicle is operated to produce such sounds.

In any event, the active microphone aspects include the speakers 301 generating sounds in a variety of different temporal and geometric patterns. For instance, aspects include at least one of the speakers 301 being configured as a microphone while at least one other (different) one of the speakers 301 is configured as a speaker to emit the predetermined sound. The other speakers 301 that are configured as speakers in this manner may sequentially or concurrently emit the predetermined sound so that the acoustic signature of the speaker(s) 301 configured as microphones may be analyzed to detect the presence and location of objects in the vehicle cabin.

Again, aspects include leveraging the geometric relationship among the speakers 301 to reduce the time and processing required to identify the object 302. As an illustrative example, the object 302 is positioned in the vehicle cabin so as to cause the acoustic signature of the speaker 301.C1 to deviate from an acoustic signature that is generated in the absence of the object 302. This deviation of the acoustic signature of the speaker 301.C1 may change in response to predetermined sounds emitted by some speakers more than others. For instance, the object 302 is disposed between the speaker 301.A2 and the speaker 301.C1, and thus predetermined sounds emitted by the speaker 301.A2 will cause the speaker 301.C1 to generate, in response, acoustic data that results in an acoustic signature that identifies a deviation in the frequency response compared to the scenario in which the object 302 is not present.

Continuing this example, aspects include the speakers 301 being grouped in accordance with the detection of objects at specific locations within the cabin of the vehicle. Using the object 302 as an example, once the speaker 301.A2 emits the predetermined sound, the resulting acoustic signature from the speaker 301.C1 is determined. This acoustic signature may thus indicate a deviation from a predetermined frequency response (i.e. predetermined acoustic signature) at one or more spectral locations in excess of a threshold value, and this process may be repeated for other speakers 301. Specifically, the speakers 301.A1 and/or the speaker 301.C2 may then emit respective predetermined sounds, with the resulting acoustic signature of the speaker 301.C1 once again being analyzed to further verify the accuracy of the first acoustic signature generated in response to the predetermined sound emitted by the speaker 301.A2.

Aspects include any suitable number of the speakers 301 emitting a predetermined sound, either concurrently or sequentially, to identify objects based upon acoustic signature deviations of other speakers 301 in this manner. As another example, one or more of the speakers 301 in the vehicle cabin may sequentially emit a predetermined sound while the acoustic data of one or more other speakers 301 is analyzed in this manner to identify acoustic signature deviations for object detection. The speakers 301 may thus emit predetermined sounds one-by-one or in accordance with a predefined speaker grouping (e.g. first the speakers 301 in row 1, and then the speakers 301 in row 2; first the speakers 301 in column A, followed by the speakers in column B, C, and D, etc.). The number of speakers 301 used to emit predetermined sounds in this manner, as well as the number of speakers 301 that are configured as microphones for which acoustic signatures are analyzed in response to the emitted predetermined sounds from other speakers 301, may be selected as a tradeoff between the accuracy of object detection, processing power, and the time required to detect the location of objects within the vehicle cabin.

As noted above, some active microphone aspects may identify objects based upon a deviation of the acoustic signature of one or more speakers from a predetermined frequency response at one or more spectral locations in excess of a threshold value. Such aspects may be particularly useful when only object detection is needed, or when a less processor-intensive option is preferred to that of a machine learning algorithm. However, the active microphone aspects also include the use of machine learning algorithms, which may be particularly useful when additional vehicle state information is desired in addition to the presence and location of objects within the vehicle cabin.

To do so, aspects include the use of calibration or training data that models the acoustic signature, or frequency response, of one or more (or all) of the vehicle speakers for a number of different vehicle states, similar to the use of calibration or training data noted above for the passive microphone aspects. For example, the calibration or training data may be performed as part of a calibration procedure in which the acoustic signals are collected and the acoustic signatures calculated for each speaker 301 in the vehicle when configured as a microphone. This calibration process may result in the generation of training data for various combinations of different vehicle states such as, for instance, different vehicle seats being occupied by a person or object, different vehicle doors being opened or closed, different vehicle windows or sunroofs being opened or closed, etc. As noted above for the passive microphone aspects, the acoustic signature data of each respective vehicle speaker may function as an input or channel to a suitable machine learning algorithm (e.g., input layer channels of a CNN) to train the machine learning algorithm.

Once trained, aspects include the machine learning algorithm being used to subsequently identify specific vehicle states based upon the acoustic signature data associated with one or more of the vehicle speakers when configured as a microphone. To do so, aspects include one or more of the vehicle speakers 301 emitting a predetermined sound while one or more of vehicle speakers 301 generate acoustic data, from which an acoustic signature is calculated and analyzed in accordance with the trained machine learning algorithm to classify the resulting acoustic data signatures, thus identifying the current vehicle state. Again, this process may be performed using any suitable number of the speakers 301 for emitting sounds and/or for generating acoustic data when operating as a microphone based upon the manner in which the machine learning algorithm was trained. In various aspects, the number of speakers 301 used to emit predetermined sounds in this manner, as well as the number of speakers 301 for which acoustic signatures are analyzed in response to emitted predetermined sounds from other speakers 301, may be selected as a tradeoff between the accuracy of identifying specific vehicle state information, processing power, and the time required to do so.

Figure 4:
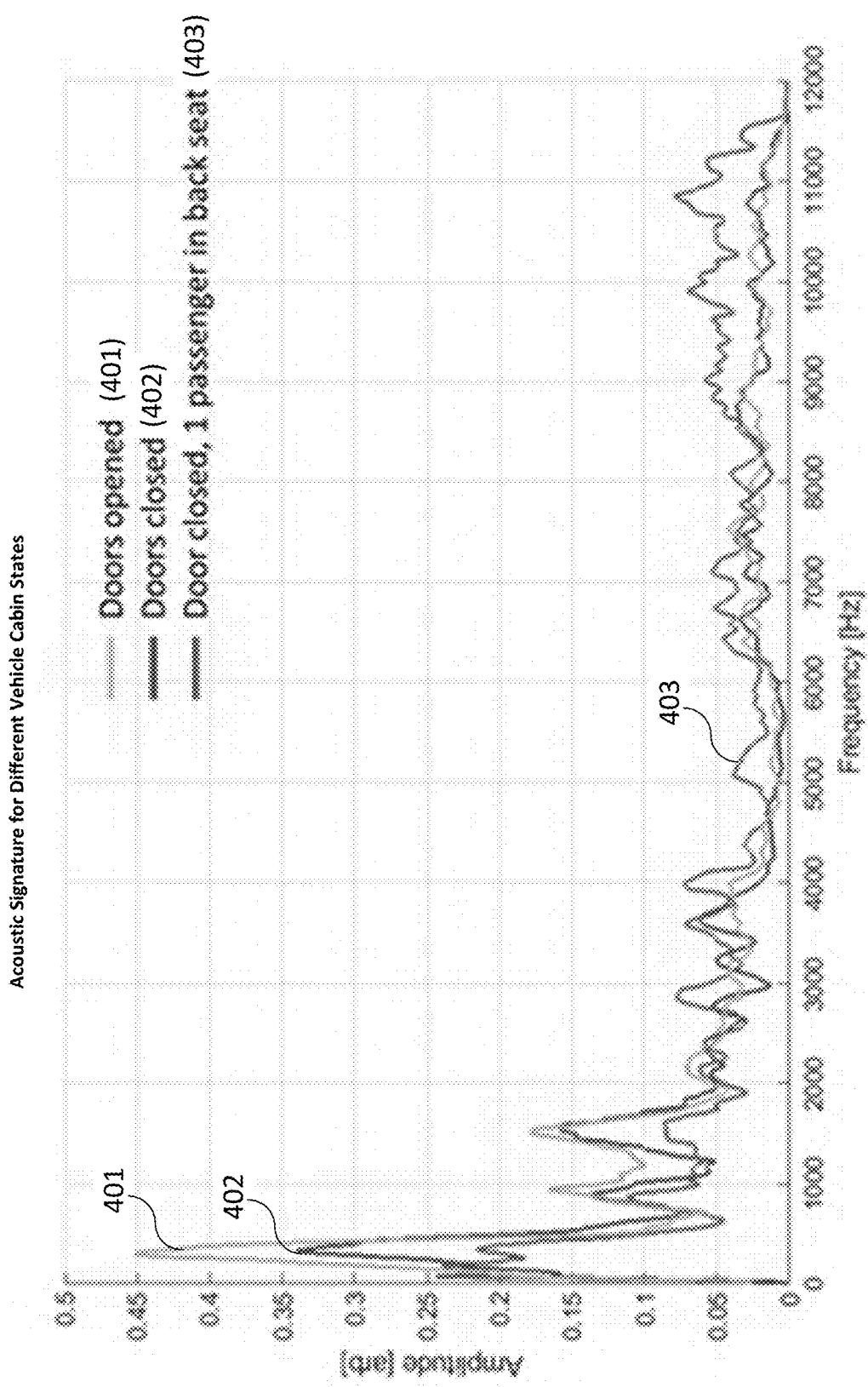
FIG. 4 illustrates an exemplary acoustic signature for different vehicle states, in accordance with various aspects of the present disclosure.

Thus, the active microphone aspects include the use of one or more of the speakers 301 to generate acoustic signature data, which is then used to classify a specific vehicle state. An example of the changes in the acoustic signature is shown in FIG. 4, which illustrates an exemplary acoustic signature for different vehicle states, in accordance with various aspects of the present disclosure. The acoustic signature 400 as shown in FIG. 4 is reproduced from a dedicated microphone placed in cabin of the vehicle for testing purposes, although any one of the vehicle speakers 301 could alternatively capture acoustic data that is used to generate an acoustic signature in a similar manner.

As shown in FIG. 4, the predetermined sound emitted by one or more of the vehicle speakers 301 results in a specific reverberation pattern that is identified in the acoustic data signals collected by one of the vehicle speakers 301 when configured to function as a microphone. In the example as shown in FIG. 4, the acoustic signature is shown as a frequency response that illustrates changes in the amplitude of acoustic data signals over a range of acoustic frequencies (0 to 12 kHz in this example). As shown in FIG. 4, the changes in the state of the vehicle such as the doors being open, closed, and the presence of a passenger in one of the rear seats modify the echo pattern inside of the vehicle, which results in a change in the reverberation shape, or frequency response, associated with that particular vehicle speaker 301. As an example, a five-seat vehicle will have a total of 32 different reverberation shapes (i.e., $2^5$, or 32 different occupancy combinations). As noted above, the acoustic signature associated with one or more of the vehicle's speakers when configured to operate as a microphone may indicate reverberation shape changes in accordance with each of these different combinations, as well as other combinations of vehicle states such as open doors, windows, sunroofs, etc. As shown in FIG. 4, the different frequency response curves 401, 402, 403 of the acoustic data signals show a marked difference among measurements, indicating that that the audio events may be classified using an appropriately trained machine learning algorithm, as discussed above. Aspects include the machine learning algorithm leveraging vehicle symmetry to achieve classification of various vehicle states with a reduced number of combinations of the calibration or training data.

Figure 5:
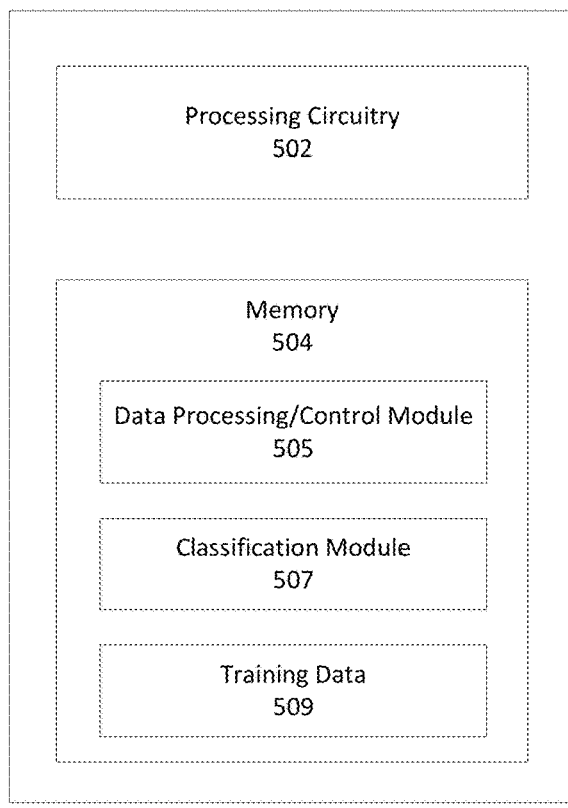
FIG. 5 illustrates an exemplary local processing unit, in accordance with various aspects of the present disclosure.

FIG. 5 illustrates an exemplary local processing unit, in accordance with various aspects of the present disclosure. The local processing unit 500 (also referred to herein as local processing circuitry or a local control system) may cause one or more of the vehicle speakers (e.g., speakers 102.1-102.N) to function in accordance with the passive and active microphone aspects as described herein. The local processing unit 500 may be configured to control, communicate with, and/or dynamically configure the speakers to function as speakers or microphones to facilitate the passive and active microphone aspects. As discussed herein, the local processing unit 500 may drive one or more of the vehicle speakers with a predetermined sound, receive acoustic data signals from the one or more vehicle speakers when configured as microphones, analyze the received acoustic data signals to calculate acoustic signatures, and identify different types of vehicle state information from the analysis of the acoustic signatures as discussed herein.

To do so, the local processing unit 500 may be implemented in different ways depending upon the particular application and/or configuration of the vehicle in which it is implemented. In an aspect, the local processing unit 500 may be identified with the local processing unit 190, as shown and described herein with reference to FIG. 1. For instance, the local processing unit 500 may include one or more of the one or more suitable processors that may be part of the vehicle's existing architecture, such as one or more ECUs, control systems, vehicle computers, etc. To provide another example, the local processing unit 500 may be integrated as part of a vehicle in which it is implemented as one or more virtual machines running as a hypervisor with respect to one or more of the vehicle's existing systems. Thus, the local processing unit 500 may be implemented using existing components of the vehicle, and may be realized via a software update that modifies the operation and/or function of one or more of these processing components.

In other aspects, the local processing unit 500 may include or more hardware and/or software components that extend or supplement the vehicle's operation. This may include adding or altering one or more vehicle components. In yet other aspects, the local processing unit 500 may be implemented as a stand-alone device, which is installed as an after-market modification to the vehicle in which it is implemented.

Although not shown in FIG. 5 for purposes of brevity, the local processing unit 500 may additionally include one or more communication interfaces (or implement such interfaces that are part of the vehicle's existing architecture). These communication interfaces may facilitate driving the vehicle speakers with audio data (e.g., predetermined sounds) and receiving the acoustic data signals from vehicle speakers when configured to function as a microphone. These communication interfaces may additionally facilitate transmitting data associated with detected or identified vehicle state information to other vehicle components, systems, and/or ECUs, which may be configured or preprogrammed to execute certain actions based upon this vehicle state information (e.g., sending a notification to a user when a window is open and it starts raining).

Regardless of the implementation of the local processing unit 500, aspects include the local processing unit 500 receiving and processing the acoustic data generated by one or more of the vehicle speakers to calculate acoustic signatures. Again, these acoustic signatures may then be used to determine different types of vehicle state information such as seat occupancy information, road conditions, whether specific windows, sunroofs, and/or doors are open or closed, etc., as discussed herein. To do so, the local processing unit 500 may include processing circuitry 502 and a memory 504. The components shown in FIG. 5 are provided for ease of explanation, and aspects include the local processing unit 500 implementing additional, less, or alternative components as those shown in FIG. 5.

In an aspect, the processing circuitry 502 may be configured as any suitable number and/or type of computer processors, which may function to control the local processing unit 500 as discussed herein. Processing circuitry 502 may be identified with one or more processors (or suitable portions thereof) implemented by the local processing unit 500. For example, the processing circuitry 502 may, for example, be identified with one or more processors such as a host processor, a digital signal processor, one or more microprocessors, graphics processors, microcontrollers, an application-specific integrated circuit (ASIC), part (or the entirety of) a field-programmable gate array (FPGA), etc. In any event, aspects include the processing circuitry 502 being configured to carry out instructions to perform arithmetical, logical, and/or input/output (I/O) operations, and/or to control the operation of one or more components of local processing unit 500 to perform various functions associated with the aspects as described herein.

For example, the processing circuitry 502 can include one or more microprocessor cores, memory registers, buffers, clocks, etc., and may generate electronic control signals associated with electronic components to control and/or modify the operation of one or more components of the local processing unit 500 as discussed herein. Moreover, aspects include processing circuitry 502 communicating with and/or controlling functions associated with the memory 504, other components of the local processing unit 500, and/or components associated with the vehicle in which the local processing unit 500 is implemented (e.g., the vehicle speakers 102.1-102.N).

In an aspect, the memory 504 stores data and/or instructions such that, when the instructions are executed by the processing circuitry 502, the processing circuitry 502 performs various functions as described herein. The memory 504 can be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 504 can be non-removable, removable, or a combination of both. For example, the memory 504 may be implemented as a non-transitory computer readable medium storing one or more executable instructions such as, for example, processor-executable instructions, logic, algorithms, code, etc.

As further discussed below, the instructions, logic, code, etc., stored in the memory 504 are represented by the various modules as shown in FIG. 5, which may enable the aspects disclosed herein to be functionally realized. Alternatively, if the aspects described herein are implemented via hardware, the modules shown in FIG. 5 associated with the memory 504 may include instructions and/or code to facilitate control and/or monitor the operation of such hardware components. In other words, the modules shown in FIG. 5 are provided for ease of explanation regarding the functional association between hardware and software components. Thus, aspects include the processing circuitry 502 executing the instructions stored in these respective modules in conjunction with one or more hardware components to perform the various functions associated with the aspects as further discussed herein.

In an aspect, the executable instructions stored in the data processing/control module 505 may facilitate, in conjunction with the processing circuitry 502, the generation and transmission of suitable electronic control signals to change the configuration of one or more vehicle speakers between speaker and a microphone modes of operation. This may include, for instance, the generation of appropriate electronic control signals that function to change the state of suitable switching components (e.g., switching components 206, 208) as discussed herein with reference to FIGS. 2A-2B. Aspects include the executable instructions stored in the data processing/control module 505 also facilitating, in conjunction with the processing circuitry 502, receiving the acoustic data signals from the vehicle speakers when configured as microphones. This acoustic data may then be stored in the memory 504 or another suitable storage location that is accessible via the local processing unit 500 and/or other components of the vehicle in which the local processing unit 500 is implemented.

The executable instructions stored in the data processing/control module 505, in conjunction with the processing circuitry 502, may also enable the local processing unit 500 to generate acoustic signatures for respective vehicle speakers using the acoustic data signals. The calculation of the acoustic signatures may be performed in the analog or the digital domain. For example, the local processing unit 500 may analyze the acoustic data signals to construct frequency response data based upon the known properties of the speaker from which the acoustic data was received, the known properties of the speaker emitting the predetermined sound, and/or the known properties of the predetermined sound, when applicable. As another example, although not shown in FIG. 5 for purposes of brevity, aspects include the local processing unit 500 utilizing and/or including one or more analog-to-digital converters (ADCs), which are not shown in FIG. 5 but may be implemented as any suitable type of data conversion component to convert the analog acoustic data signals to digital data, which may then be processed to calculate the acoustic signatures. These ADCs may additionally or alternatively be part of the speaker architecture such that the acoustic data signals may be received by the local processing unit 500 as analog or digital signals.

Optimally, aspects include the executable instructions stored in the data processing/control module 505, in conjunction with the processing circuitry 502, enabling the local processing unit 500 to generate predetermined sounds and to drive the vehicle speakers using these predetermined sounds. This is optional because aspects may alternatively include the use of existing vehicle sounds for this purpose, as noted above.

In an aspect, the machine learning algorithm and training thereof, which may be used to classify the vehicle states using the acoustic signature data as noted herein, may be implemented as a combination of the processing circuitry 502 executing instructions stored in the memory 504 by the processing circuitry 502. For example, a machine learning algorithm such as a neural network, for example, may be represented as a combination of the functionality associated with execution of the instructions stored in the classification module 507 in accordance with the stored training data 509. For instance, if a convolutional neural network (CNN) is implemented, the input layer, hidden layers, and output layers of the CNN may be represented as software components associated with execution of instructions stored in the classification module 507 by the processing circuitry 502. In this way, the functionality of the CNN (or other suitable machine learning algorithm) may be realized to classify the various vehicle states, as discussed herein.

The training data 509 may represent a portion of the memory 504 storing calibration or training data used to train the machine learning algorithm implemented by the local processing unit 500, as discussed herein. For instance, the training data 509 may represent stored data related to passive microphone aspects, which may be training data related to the operation of the vehicle as noted above in various different driving conditions, roads, and/or operative states. Additionally or alternatively, the training data 509 may represent data related to active microphone aspects, which may include the frequency, duration, shape, and/or amplitude of the predetermined sounds, speaker firing and listening patterns, acoustic signatures associated with various combinations of vehicle occupancy and the state of windows, doors, and/or sunroofs, etc. Although shown in FIG. 5 as being stored as part of the memory 504, the training data 509 may be stored in any suitable location that is accessible by the local processing unit 500.

In various aspects, the local processing unit 500 may function as a control system of the vehicle and/or may communicate with one or more control systems of the vehicle in which hit is implemented to execute specific actions based upon the detected vehicle state information. As noted herein, this may be the control of various vehicle components such as closing windows or sunroofs, issuing notifications in the vehicle, transmitting notifications, etc. In other words, the local processing circuitry 502 may identify the state of the vehicle and provide this state information to a suitable interface for communication with a control system of the vehicle to execute certain actions based upon the state of the vehicle. Such a suitable interface and communication may be in accordance with any suitable communication protocol and may implement, for example, one or more communication networks, interfaces, etc., implemented within the vehicle (e.g., interfaces and communications among ECUs, local vehicle networks, a CAN bus, etc.). As another example, when the local processing unit 500 functions as the vehicle control system that controls the execution of such actions directly, then the interface may include interconnections among and/or within the various components of the local processing unit 500 such as buses, drivers, etc., as well as the various interconnections within the vehicle that facilitate such actions being executed (e.g., a vehicle computer that controls the state of windows and/or sunroofs, etc.).

Again, machine learning algorithms may not be required for some aspects, such as when deviations in the amplitude of specific spectral locations in the speaker acoustic signatures is sufficient to identify specific vehicle state information. Thus, aspects include the classification module 507 additionally or alternatively including instructions regarding specific thresholding requirements regarding deviations from "standard" or "default" acoustic signatures, corresponding vehicle state information associated with such deviations (e.g., an object located in a specific vehicle seat when a specific speaker's acoustic signature deviates in a specific manner), etc. Moreover, in accordance with such aspects, the training data 509 may store the data used to identify such acoustic deviations and the corresponding vehicle state, such as the deviation thresholds, spectral locations of the deviations within acoustic signatures, acoustic signature shapes and changes thereof, etc.

Although the aspects described herein are explained with respect to the re-use of in vehicle speakers configured as microphones, the aspects are not limited to these examples. Instead, the aspects described herein may implement any suitable number and/or type of vehicle microphones in addition to or instead of the use of the speakers when configured as microphones. For example, the microphones may be part of the vehicle's existing design or added as aftermarket modifications. In such a case, the training data may be generated and used to identify acoustic signatures and vehicle estate information using acoustic data signals collected from such microphones and/or speakers configured as microphones, as the case may be.

EXAMPLES

The following examples pertain to further aspects.

Example 1 is a device for analyzing acoustic data in a vehicle, comprising: a processor configured to receive, from at least one speaker in the vehicle, acoustic data signals generated from vibration of the at least one speaker configured as a microphone; and a memory configured to store instructions that, when executed by the processor, cause the processor to calculate an acoustic signature associated with the at least one speaker based on the received acoustic data signals, and to determine a state of the vehicle based on the acoustic signature, wherein the processor is further configured to provide the state of the vehicle to an interface for communication with a control system of the vehicle to execute certain actions based upon the state of the vehicle.

In Example 2, the subject matter of Example 1, wherein the acoustic signature represents a frequency response of the at least one speaker that indicates changes in acoustic amplitude measured by the at least one speaker over an acoustic frequency spectrum.

In Example 3, the subject matter of any combination of Examples 1-2, wherein the acoustic data signals are generated by the at least one speaker configured as a microphone from at least one of (i) vibrations caused by driving the vehicle, and (ii) vibrations resulting from an engine of the vehicle, and wherein the state of the vehicle includes at least one of (i) a road condition, and (ii) vehicle diagnostics.

In Example 4, the subject matter of any combination of Examples 1-3, wherein the state of the vehicle includes one or more of (i) an occupancy state that is indicative of which vehicle seats are occupied by a person or object, (ii) an open or closed state of one or more vehicle doors, and (iii) an open or closed state of one or more vehicle windows or sunroofs.

In Example 5, the subject matter of any combination of Examples 1-4, wherein: the at least one speaker comprises a first speaker and a second speaker, the processor is configured to drive the second speaker with a predetermined sound, and the acoustic data signals are generated from the first speaker in response to the predetermined sound generated from the second speaker.

In Example 6, the subject matter of any combination of Examples 1-5, wherein the processor is configured to determine that an object is disposed in the vehicle between the first speaker and the second speaker when the acoustic signature associated with the first speaker deviates from a predetermined frequency response at one or more spectral locations in excess of a threshold value.

In Example 7, the subject matter of any combination of Examples 1-6, wherein the at least one speaker comprises a set of speakers in the vehicle, and wherein the instructions stored in the memory, when executed by the processor, cause the processor to receive acoustic data from each one of the set of speakers, to calculate a respective acoustic signature for each speaker from among the set of speakers, and to classify the acoustic signature received from each speaker from among the set of speakers in accordance with a machine learning algorithm to determine the state of the vehicle.

In Example 8, the subject matter of any combination of Examples 1-7, wherein the machine learning algorithm is trained in accordance with training data that includes a frequency response for each speaker from among the set of speakers for a plurality of different vehicle states, the plurality of different vehicle states including one or more combinations of (i) different vehicle seats being occupied by a person or object, (ii) different vehicle doors being opened or closed, and (iii) different vehicle windows or sunroofs being opened or closed.

Example 9 is a vehicle, comprising: a first speaker in the vehicle configured to generate acoustic data signals from a vibration of the first speaker configured as a microphone; and local processing circuitry configured to calculate an acoustic signature associated with the first speaker based on the received acoustic data signals, and to determine a state of the vehicle based on the acoustic signature, wherein the local processing circuitry is further configured to provide the state of the vehicle to an interface for communication with a control system of the vehicle to execute certain actions based upon the state of the vehicle.

In Example 10, the subject matter of Example 9, wherein the acoustic signature represents a frequency response of the first speaker that indicates changes in acoustic amplitude measured by the first speaker over an acoustic frequency spectrum.

In Example 11, the subject matter of any combination of Examples 9-10, wherein the acoustic data signals are generated by the first speaker configured as a microphone from at least one of (i) vibrations caused by driving the vehicle, and (ii) vibrations resulting from an engine of the vehicle, and wherein the state of the vehicle includes at least one of (i) a road condition, and (ii) vehicle diagnostics.

In Example 12, the subject matter of any combination of Examples 9-11, wherein the state of the vehicle includes one or more of (i) an occupancy state that is indicative of which vehicle seats are occupied by a person or object, (ii) an open or closed state of one or more vehicle doors, and (iii) an open or closed state of one or more vehicle windows or sunroofs.

In Example 13, the subject matter of any combination of Examples 9-12, wherein the local processing circuitry is configured to drive a second speaker with a predetermined sound, and wherein the acoustic data signals are generated by the first speaker in response to the predetermined sound generated by the second speaker.

In Example 14, the subject matter of any combination of Examples 9-13, wherein the local processing circuitry is configured to determine that an object is disposed in the vehicle between the first speaker and the second speaker when the acoustic signature associated with the first speaker deviates from a predetermined frequency response at one or more spectral locations in excess of a threshold value.

In Example 15, the subject matter of any combination of Examples 9-14, wherein the first speaker is from among a set of speakers in the vehicle, and wherein the local processing circuitry is configured to receive acoustic data from each speaker from among the set of speakers, to calculate a respective acoustic signature for each speaker from among the set of speakers, and to classify the acoustic signature received from each speaker from among the set of speakers in accordance with a machine learning algorithm to determine the state of the vehicle.

In Example 16, the subject matter of any combination of Examples 9-15, wherein the machine learning algorithm is trained in accordance with training data that includes a frequency response for each speaker from among the set of speakers for a plurality of different vehicle states, the plurality of different vehicle states including one or more combinations of (i) different vehicle seats being occupied by a person or object, (ii) different vehicle doors being opened or closed, and (iii) different vehicle windows or sunroofs being opened or closed.

Example 17 is a non-transitory computer-readable medium having instructions stored thereon that, when executed by one or more processors of a control system associated with a vehicle, cause the control system to: receive, from a first speaker in the vehicle, acoustic data signals generated from a vibration of the first speaker configured as a microphone; calculate an acoustic signature associated with the first speaker based on the received acoustic data signals; determine a state of the vehicle based on the acoustic signature; and provide the state of the vehicle to an interface for communication with a control system of the vehicle to execute certain actions based upon the state of the vehicle.

In Example 18, the subject matter of Example 17, wherein the acoustic signature represents a frequency response of the first speaker that indicates changes in acoustic amplitude measured by the first speaker over an acoustic frequency spectrum.

In Example 19, the subject matter of any combination of Examples 17-18, wherein the acoustic data signals are generated by the first speaker configured as a microphone as a result of at least one of (i) vibrations caused by driving the vehicle, and (ii) vibrations resulting from an engine of the vehicle, and wherein the state of the vehicle includes at least one of (i) a road condition, and (ii) vehicle diagnostics.

In Example 20, the subject matter of any combination of Examples 17-19, wherein the state of the vehicle includes one or more of (i) an occupancy state that is indicative of which vehicle seats are occupied by a person or object, (ii) an open or closed state of one or more vehicle doors, and (iii) an open or closed state of one or more vehicle windows or sunroofs.

In Example 21, the subject matter of any combination of Examples 17-20, wherein the non-transitory computer-readable medium further includes instructions that, when executed by the one or more processors of the control system, cause the control system to drive a second speaker with a predetermined sound, the acoustic data signals being generated by the first speaker in response to the predetermined sound generated by the second speaker.

In Example 22, the subject matter of any combination of Examples 17-21, further including instructions that, when executed by the one or more processors of the control system, cause the control system to determine that an object is disposed in the vehicle between the first speaker and the second speaker when the acoustic signature associated with the first speaker deviates from a predetermined frequency response at one or more spectral locations in excess of a threshold value.

In Example 23, the subject matter of any combination of Examples 17-22, wherein the first speaker is from among a set of speakers in the vehicle, and further including instructions that, when executed by the one or more processors of the control system, cause the control system to receive acoustic data from each speaker from among the set of speakers, to calculate a respective acoustic signature for each speaker from among the set of speakers, and to classify the acoustic signature received from each speaker from among the set of speakers in accordance with a machine learning algorithm to determine the state of the vehicle.

In Example 24, the subject matter of any combination of Examples 17-23, wherein the machine learning algorithm is trained in accordance with training data that includes a frequency response for each speaker from among the set of speakers for a plurality of different vehicle states, the plurality of different vehicle states including one or more combinations of (i) different vehicle seats being occupied by a person or object, (ii) different vehicle doors being opened or closed, and (iii) different vehicle windows or sunroofs being opened or closed.

Example 25 is a means for analyzing acoustic data in a vehicle, comprising: a processing means for receiving, from at least one speaker in the vehicle, acoustic data signals generated from vibration of the at least one speaker configured as a microphone; and a memory configured to store instructions that, when executed by the processing means, cause the processing means to calculate an acoustic signature associated with the at least one speaker based on the received acoustic data signals, and to determine a state of the vehicle based on the acoustic signature, wherein the processing means provides the state of the vehicle to an interface for communication with a control means of the vehicle to execute certain actions based upon the state of the vehicle.

In Example 26, the subject matter of Example 25, wherein the acoustic signature represents a frequency response of the at least one speaker that indicates changes in acoustic amplitude measured by the at least one speaker over an acoustic frequency spectrum.

In Example 27, the subject matter of any combination of Examples 25-26, wherein the acoustic data signals are generated by the at least one speaker configured as a microphone from at least one of (i) vibrations caused by driving the vehicle, and (ii) vibrations resulting from an engine of the vehicle, and wherein the state of the vehicle includes at least one of (i) a road condition, and (ii) vehicle diagnostics.

In Example 28, the subject matter of any combination of Examples 25-27, wherein the state of the vehicle includes one or more of (i) an occupancy state that is indicative of which vehicle seats are occupied by a person or object, (ii) an open or closed state of one or more vehicle doors, and (iii) an open or closed state of one or more vehicle windows or sunroofs.

In Example 29, the subject matter of any combination of Examples 25-28, wherein: the at least one speaker comprises a first speaker and a second speaker, the processing means drives the second speaker with a predetermined sound, and the acoustic data signals are generated from the first speaker in response to the predetermined sound generated from the second speaker.

In Example 30, the subject matter of any combination of Examples 25-29, wherein the processing means determines that an object is disposed in the vehicle between the first speaker and the second speaker when the acoustic signature associated with the first speaker deviates from a predetermined frequency response at one or more spectral locations in excess of a threshold value.

In Example 31, the subject matter of any combination of Examples 25-30, wherein the at least one speaker comprises a set of speakers in the vehicle, and wherein the instructions stored in the memory, when executed by the processing means, cause the processing means to receive acoustic data from each one of the set of speakers, to calculate a respective acoustic signature for each speaker from among the set of speakers, and to classify the acoustic signature received from each speaker from among the set of speakers in accordance with a machine learning algorithm to determine the state of the vehicle.

In Example 32, the subject matter of any combination of Examples 25-31, wherein the machine learning algorithm is trained in accordance with training data that includes a frequency response for each speaker from among the set of speakers for a plurality of different vehicle states, the plurality of different vehicle states including one or more combinations of (i) different vehicle seats being occupied by a person or object, (ii) different vehicle doors being opened or closed, and (iii) different vehicle windows or sunroofs being opened or closed.

Example 33 is a vehicle, comprising: a first speaker in the vehicle configured to generate acoustic data signals from a vibration of the first speaker configured as a microphone; and local processing means for calculating an acoustic signature associated with the first speaker based on the received acoustic data signals, and determining a state of the vehicle based on the acoustic signature, wherein the local processing means provides the state of the vehicle to an interface for communication with a control system of the vehicle to execute certain actions based upon the state of the vehicle.

In Example 34, the subject matter of Example 33, wherein the acoustic signature represents a frequency response of the first speaker that indicates changes in acoustic amplitude measured by the first speaker over an acoustic frequency spectrum.

In Example 35, the subject matter of any combination of Examples 33-34, wherein the acoustic data signals are generated by the first speaker configured as a microphone from at least one of (i) vibrations caused by driving the vehicle, and (ii) vibrations resulting from an engine of the vehicle, and wherein the state of the vehicle includes at least one of (i) a road condition, and (ii) vehicle diagnostics.

In Example 36, the subject matter of any combination of Examples 33-35, wherein the state of the vehicle includes one or more of (i) an occupancy state that is indicative of which vehicle seats are occupied by a person or object, (ii) an open or closed state of one or more vehicle doors, and (iii) an open or closed state of one or more vehicle windows or sunroofs.

In Example 37, the subject matter of any combination of Examples 33-36, wherein the local processing means drives a second speaker with a predetermined sound, and wherein the acoustic data signals are generated by the first speaker in response to the predetermined sound generated by the second speaker.

In Example 38, the subject matter of any combination of Examples 33-37, wherein the local processing means determines that an object is disposed in the vehicle between the first speaker and the second speaker when the acoustic signature associated with the first speaker deviates from a predetermined frequency response at one or more spectral locations in excess of a threshold value.

In Example 39, the subject matter of any combination of Examples 33-38, wherein the first speaker is from among a set of speakers in the vehicle, and wherein the local processing means receives acoustic data from each speaker from among the set of speakers, calculates a respective acoustic signature for each speaker from among the set of speakers, and classifies the acoustic signature received from each speaker from among the set of speakers in accordance with a machine learning algorithm to determine the state of the vehicle.

In Example 40, the subject matter of any combination of Examples 33-39, wherein the machine learning algorithm is trained in accordance with training data that includes a frequency response for each speaker from among the set of speakers for a plurality of different vehicle states, the plurality of different vehicle states including one or more combinations of (i) different vehicle seats being occupied by a person or object, (ii) different vehicle doors being opened or closed, and (iii) different vehicle windows or sunroofs being opened or closed.

Example 41 is a non-transitory computer-readable medium having instructions stored thereon that, when executed by one or more processing means of a control means associated with a vehicle, cause the control means to: receive, from a first speaker in the vehicle, acoustic data signals generated from a vibration of the first speaker configured as a microphone; calculate an acoustic signature associated with the first speaker based on the received acoustic data signals; determine a state of the vehicle based on the acoustic signature; and provide the state of the vehicle to an interface for communication with a control system of the vehicle to execute certain actions based upon the state of the vehicle.

In Example 42, the subject matter of Example 41, wherein the acoustic signature represents a frequency response of the first speaker that indicates changes in acoustic amplitude measured by the first speaker over an acoustic frequency spectrum.

In Example 43, the subject matter of any combination of Examples 41-42, wherein the acoustic data signals are generated by the first speaker configured as a microphone as a result of at least one of (i) vibrations caused by driving the vehicle, and (ii) vibrations resulting from an engine of the vehicle, and wherein the state of the vehicle includes at least one of (i) a road condition, and (ii) vehicle diagnostics.

In Example 44, the subject matter of any combination of Examples 41-43, wherein the state of the vehicle includes one or more of (i) an occupancy state that is indicative of which vehicle seats are occupied by a person or object, (ii) an open or closed state of one or more vehicle doors, and (iii) an open or closed state of one or more vehicle windows or sunroofs.

In Example 45, the subject matter of any combination of Examples 41-44, wherein the non-transitory computer-readable medium further includes instructions that, when executed by the one or more processing means of the control means, cause the control means to drive a second speaker with a predetermined sound, the acoustic data signals being generated by the first speaker in response to the predetermined sound generated by the second speaker.

In Example 46, the subject matter of any combination of Examples 41-45, further including instructions that, when executed by the one or more processing means of the control means, cause the control means to determine that an object is disposed in the vehicle between the first speaker and the second speaker when the acoustic signature associated with the first speaker deviates from a predetermined frequency response at one or more spectral locations in excess of a threshold value.

In Example 47, the subject matter of any combination of Examples 41-46, wherein the first speaker is from among a set of speakers in the vehicle, and further including instructions that, when executed by the one or more processing means of the control means, cause the control means to receive acoustic data from each speaker from among the set of speakers, to calculate a respective acoustic signature for each speaker from among the set of speakers, and to classify the acoustic signature received from each speaker from among the set of speakers in accordance with a machine learning algorithm to determine the state of the vehicle.

In Example 48, the subject matter of any combination of Examples 41-47, wherein the machine learning algorithm is trained in accordance with training data that includes a frequency response for each speaker from among the set of speakers for a plurality of different vehicle states, the plurality of different vehicle states including one or more combinations of (i) different vehicle seats being occupied by a person or object, (ii) different vehicle doors being opened or closed, and (iii) different vehicle windows or sunroofs being opened or closed.

An apparatus as shown and described.
A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like. A "vehicle" may be understood to include any type of vehicle, as described above, which is driven on the ground, e.g., on a street, on a road, on a track, on one or more rails, off-road, etc.

What is claimed is:

1. A device for analyzing acoustic data in a vehicle, comprising:
   a processor configured to receive, from at least one speaker in the vehicle, acoustic data signals generated from vibration of the at least one speaker configured as a microphone; and
   a memory configured to store instructions that, when executed by the processor, cause the processor to calculate an acoustic signature associated with the at least one speaker based on the received acoustic data signals, and to determine a state of the vehicle based on the acoustic signature,
   wherein the processor is further configured to provide the state of the vehicle to an interface for communication with a control system of the vehicle to execute an action based upon the state of the vehicle,
   wherein the at least one speaker is (i) part of an audio sound system in the vehicle, and (ii) selectively configurable as a microphone to generate acoustic data signals and as a speaker to emit sound in accordance with the audio sound system, and
   wherein the acoustic signature represents a frequency response of the at least one speaker when configured as a microphone that indicates changes in acoustic amplitude measured by the at least one speaker over an acoustic frequency spectrum.

2. The device of claim 1, wherein the acoustic data signals are generated by the at least one speaker configured as a microphone from at least one of (i) vibrations caused by driving the vehicle, and (ii) vibrations resulting from an engine of the vehicle, and
   wherein the state of the vehicle includes at least one of (i) a road condition, and (ii) vehicle diagnostics.

3. The device of claim 1, wherein the state of the vehicle includes one or more of (i) an occupancy state that is indicative of which vehicle seats are occupied by a person or object, (ii) an open or closed state of one or more vehicle doors, and (iii) an open or closed state of one or more vehicle windows or sunroofs.

4. The device of claim 1, wherein:
   the at least one speaker comprises a first speaker and a second speaker,
   the processor is configured to drive the second speaker with a predetermined sound, and
   the acoustic data signals are generated from the first speaker in response to the predetermined sound generated from the second speaker.

5. The device of claim 4, wherein the processor is configured to determine that an object is disposed in the vehicle between the first speaker and the second speaker when the acoustic signature associated with the first speaker deviates from a predetermined frequency response at one or more spectral locations in excess of a threshold value.

6. The device of claim 1, wherein the at least one speaker comprises a set of speakers in the vehicle, and
   wherein the instructions stored in the memory, when executed by the processor, cause the processor to receive acoustic data from each one of the set of speakers, to calculate a respective acoustic signature for each speaker from among the set of speakers, and to classify the acoustic signature received from each speaker from among the set of speakers in accordance with a machine learning algorithm to determine the state of the vehicle.

7. The device of claim 6, wherein the machine learning algorithm is trained in accordance with training data that includes a frequency response for each speaker from among the set of speakers for a plurality of different vehicle states, the plurality of different vehicle states including one or more combinations of (i) different vehicle seats being occupied by a person or object, (ii) different vehicle doors being opened or closed, and (iii) different vehicle windows or sunroofs being opened or closed.

8. A vehicle, comprising:
   a first speaker in the vehicle configured to generate acoustic data signals from a vibration of the first speaker configured as a microphone; and
   local processing circuitry configured to calculate an acoustic signature associated with the first speaker based on the received acoustic data signals, and to determine a state of the vehicle based on the acoustic signature,
   wherein the local processing circuitry is further configured to provide the state of the vehicle to an interface for communication with a control system of the vehicle to execute an action based upon the state of the vehicle,
   wherein the first speaker is (i) part of an audio sound system in the vehicle, and (ii) selectively configurable as a microphone to generate acoustic data signals and as a speaker to emit sound in accordance with the audio sound system, and wherein the acoustic signature represents a frequency response of the first speaker when configured as a microphone that indicates changes in acoustic amplitude measured by the first speaker over an acoustic frequency spectrum.

9. The vehicle of claim 8, wherein the acoustic data signals are generated by the first speaker configured as a microphone from at least one of (i) vibrations caused by driving the vehicle, and (ii) vibrations resulting from an engine of the vehicle, and wherein the state of the vehicle includes at least one of (i) a road condition, and (ii) vehicle diagnostics.

10. The vehicle of claim 8, wherein the state of the vehicle includes one or more of (i) an occupancy state that is indicative of which vehicle seats are occupied by a person or object, (ii) an open or closed state of one or more vehicle doors, and (iii) an open or closed state of one or more vehicle windows or sunroofs.

11. The vehicle of claim 8, wherein the local processing circuitry is configured to drive a second speaker with a predetermined sound, and wherein the acoustic data signals are generated by the first speaker in response to the predetermined sound generated by the second speaker.

12. The vehicle of claim 11, wherein the local processing circuitry is configured to determine that an object is disposed in the vehicle between the first speaker and the second speaker when the acoustic signature associated with the first speaker deviates from a predetermined frequency response at one or more spectral locations in excess of a threshold value.

13. The vehicle of claim 8, wherein the first speaker is from among a set of speakers in the vehicle, and wherein the local processing circuitry is configured to receive acoustic data from each speaker from among the set of speakers, to calculate a respective acoustic signature for each speaker from among the set of speakers, and to classify the acoustic signature received from each speaker from among the set of speakers in accordance with a machine learning algorithm to determine the state of the vehicle.

14. The vehicle of claim 13, wherein the machine learning algorithm is trained in accordance with training data that includes a frequency response for each speaker from among the set of speakers for a plurality of different vehicle states, the plurality of different vehicle states including one or more combinations of (i) different vehicle seats being occupied by a person or object, (ii) different vehicle doors being opened or closed, and (iii) different vehicle windows or sunroofs being opened or closed.

15. A non-transitory computer-readable medium having instructions stored thereon that, when executed by one or more processors of a control system associated with a vehicle, cause the control system to:

receive, from a first speaker in the vehicle, acoustic data signals generated from a vibration of the first speaker configured as a microphone;

calculate an acoustic signature associated with the first speaker based on the received acoustic data signals;

determine a state of the vehicle based on the acoustic signature; and execute an action based upon the state of the vehicle, wherein the first speaker is (i) part of an audio sound system in the vehicle, and (ii) selectively configurable as a microphone to generate acoustic data signals and as a speaker to emit sound in accordance with the audio sound system, and wherein the acoustic signature represents a frequency response of the first speaker when configured as a microphone that indicates changes in acoustic amplitude measured by the first speaker over an acoustic frequency spectrum.

16. The non-transitory computer-readable medium of claim 15, wherein the acoustic data signals are generated by the first speaker configured as a microphone as a result of at least one of (i) vibrations caused by driving the vehicle, and (ii) vibrations resulting from an engine of the vehicle, and wherein the state of the vehicle includes at least one of (i) a road condition, and (ii) vehicle diagnostics.

17. The non-transitory computer-readable medium of claim 15, wherein the state of the vehicle includes one or more of (i) an occupancy state that is indicative of which vehicle seats are occupied by a person or object, (ii) an open or closed state of one or more vehicle doors, and (iii) an open or closed state of one or more vehicle windows or sunroofs.

18. The non-transitory computer-readable medium of claim 15, wherein the non-transitory computer-readable medium further includes instructions that, when executed by the one or more processors of the control system, cause the control system to drive a second speaker with a predetermined sound, the acoustic data signals being generated by the first speaker in response to the predetermined sound generated by the second speaker.

19. The non-transitory computer-readable medium of claim 18, further including instructions that, when executed by the one or more processors of the control system, cause the control system to determine that an object is disposed in the vehicle between the first speaker and the second speaker when the acoustic signature associated with the first speaker deviates from a predetermined frequency response at one or more spectral locations in excess of a threshold value.

20. The non-transitory computer-readable medium of claim 15, wherein the first speaker is from among a set of speakers in the vehicle, and further including instructions that, when executed by the one or more processors of the control system, cause the control system to receive acoustic data from each speaker from among the set of speakers, to calculate a respective acoustic signature for each speaker from among the set of speakers, and to classify the acoustic signature received from each speaker from among the set of speakers in accordance with a machine learning algorithm to determine the state of the vehicle.

21. The non-transitory computer-readable medium of claim 20, wherein the machine learning algorithm is trained in accordance with training data that includes a frequency response for each speaker from among the set of speakers for a plurality of different vehicle states, the plurality of different vehicle states including one or more combinations of (i) different vehicle seats being occupied by a person or object, (ii) different vehicle doors being opened or closed, and (iii) different vehicle windows or sunroofs being opened or closed.

22. The device of claim 1, wherein the control system of the vehicle is configured to execute the action to alter the state of the vehicle.

23. The device of claim 22, wherein the frequency response associated with the acoustic signature has an upper frequency that is less than 20 kHz.

* * * * *